March 11, 1924. 1,486,436
C. H. JONES
GRADING MACHINE
Filed Feb. 5, 1923 5 Sheets-Sheet 1

Inventor:
C. H. JONES,
By W. J. Fitz Gerald & Co.
Attorneys

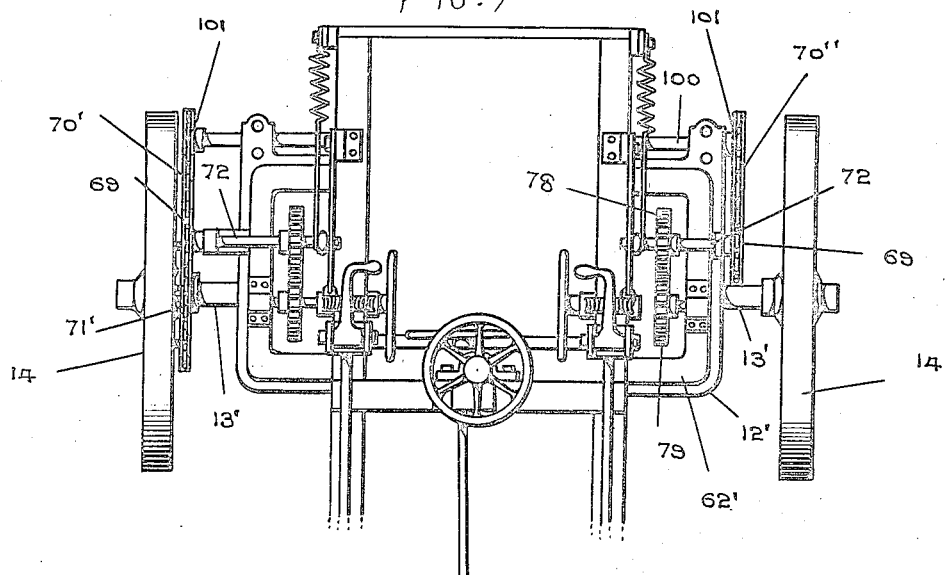
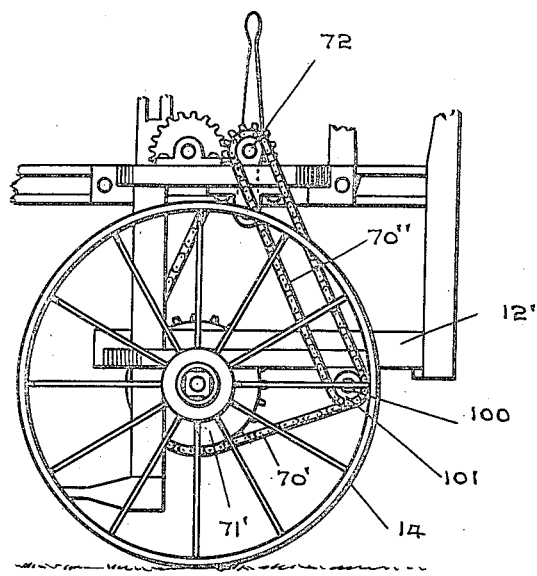
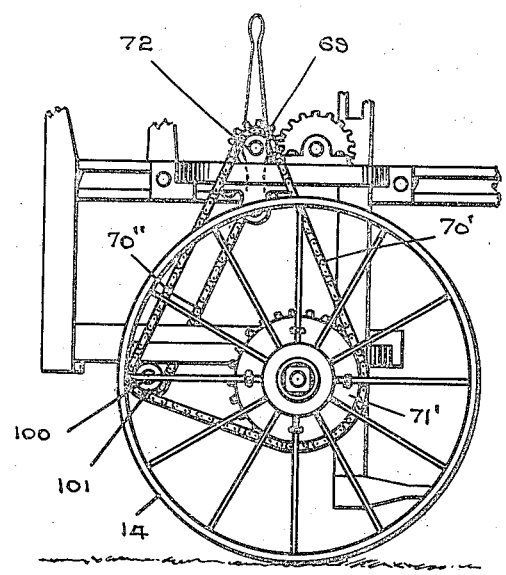

Patented Mar. 11, 1924.

1,486,436

UNITED STATES PATENT OFFICE.

CHARLES H. JONES, OF GALVA, ILLINOIS.

GRADING MACHINE.

Application filed February 5, 1923. Serial No. 617,093.

*To all whom it may concern:*

Be it known that I, CHARLES H. JONES, a citizen of the United States, residing at Galva, in the county of Henry and State of Illinois, have invented certain new and useful Improvements in Grading Machines; and I do hereby declare the following to be a full, clear, and exact description of the invention, such as will enable others skilled in the art to which it appertains to make and use the same.

The present invention relates to grading or scraping machines, such as used for surfacing roads, and aims to provide a machine of the kind improved generally in its construction and details to operate in a practical and efficient manner, this application being in part a division of the application filed February 18, 1921, Serial No. 446,075.

One of the more specific objects of the invention is the provision of novel means for mounting and carrying the scraper blade in order that it can be positioned properly for the work to be done, and enabling the blade to be adjusted vertically, to be tilted about a substantially longitudinal axis of the machine, and to be turned about a substantially vertical axis.

Another object is the provision of novel means for turning the scraper blade about a substantially vertical axis under the control of the operator.

A further object is the provision of novel mechanism for raising and lowering the opposite ends of the blade, and including means under the control of the operator whereby the blade can be raised by power, to relieve the operator of considerable work.

A still further object is the provision of such mechanism enabling the scraper blade to be turned to different angles and to be slid longitudinally of itself.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 5 is a sectional view on the line 5—5 of Fig. 2.

Fig. 6 is an enlarged sectional detail on the line 6—6 of Fig. 5.

Fig. 7 is a fragmentary plan view of the rear end portion of the machine showing a modified form of driving gearing for the adjusting devices.

Figs. 8 and 9 are opposite side elevations of the gearing shown in Fig. 7.

Figure 1:
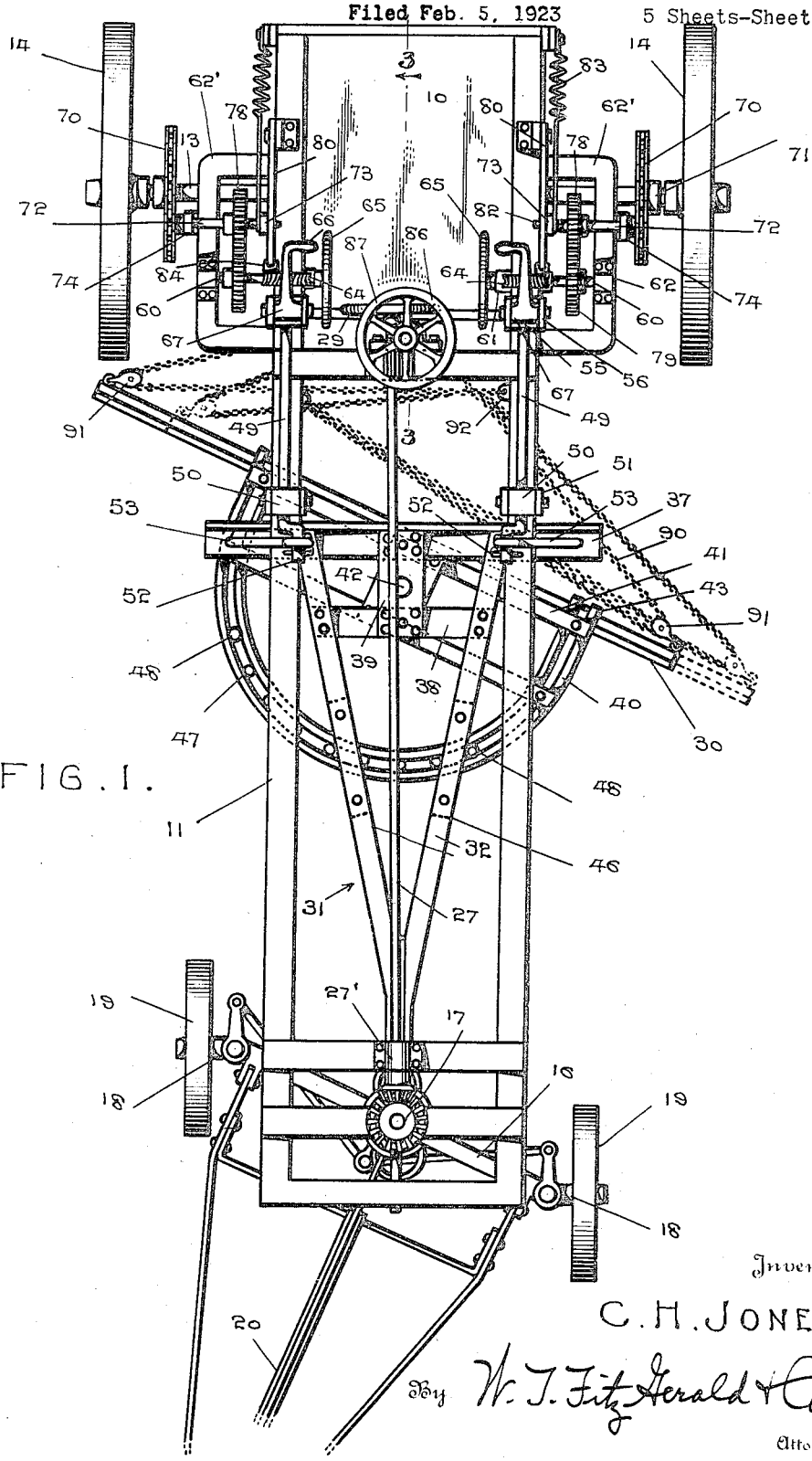
Figure 1 is a plan view of the machine.
Figure 2:
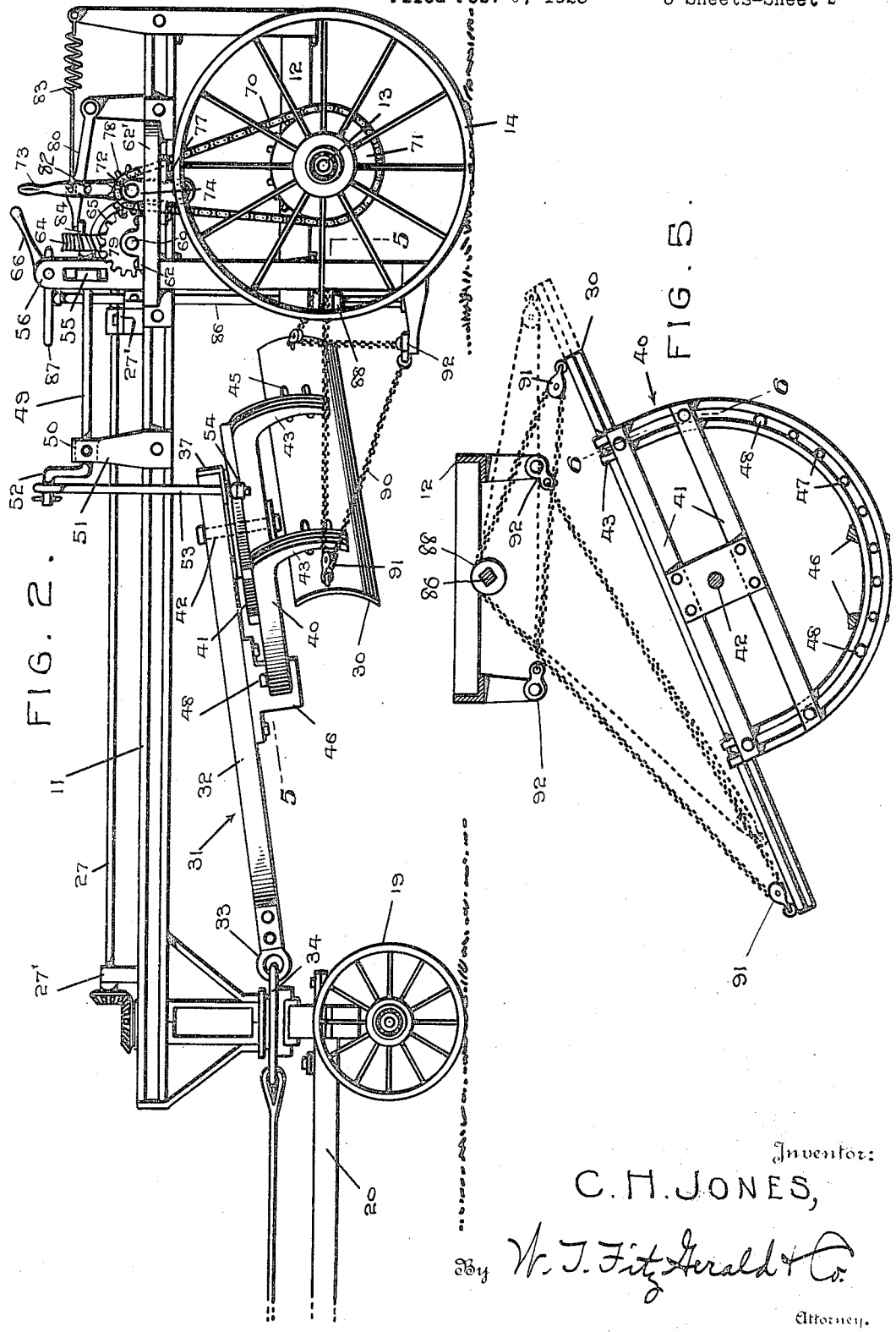
Fig. 2 is a side elevation thereof
Figure 3:
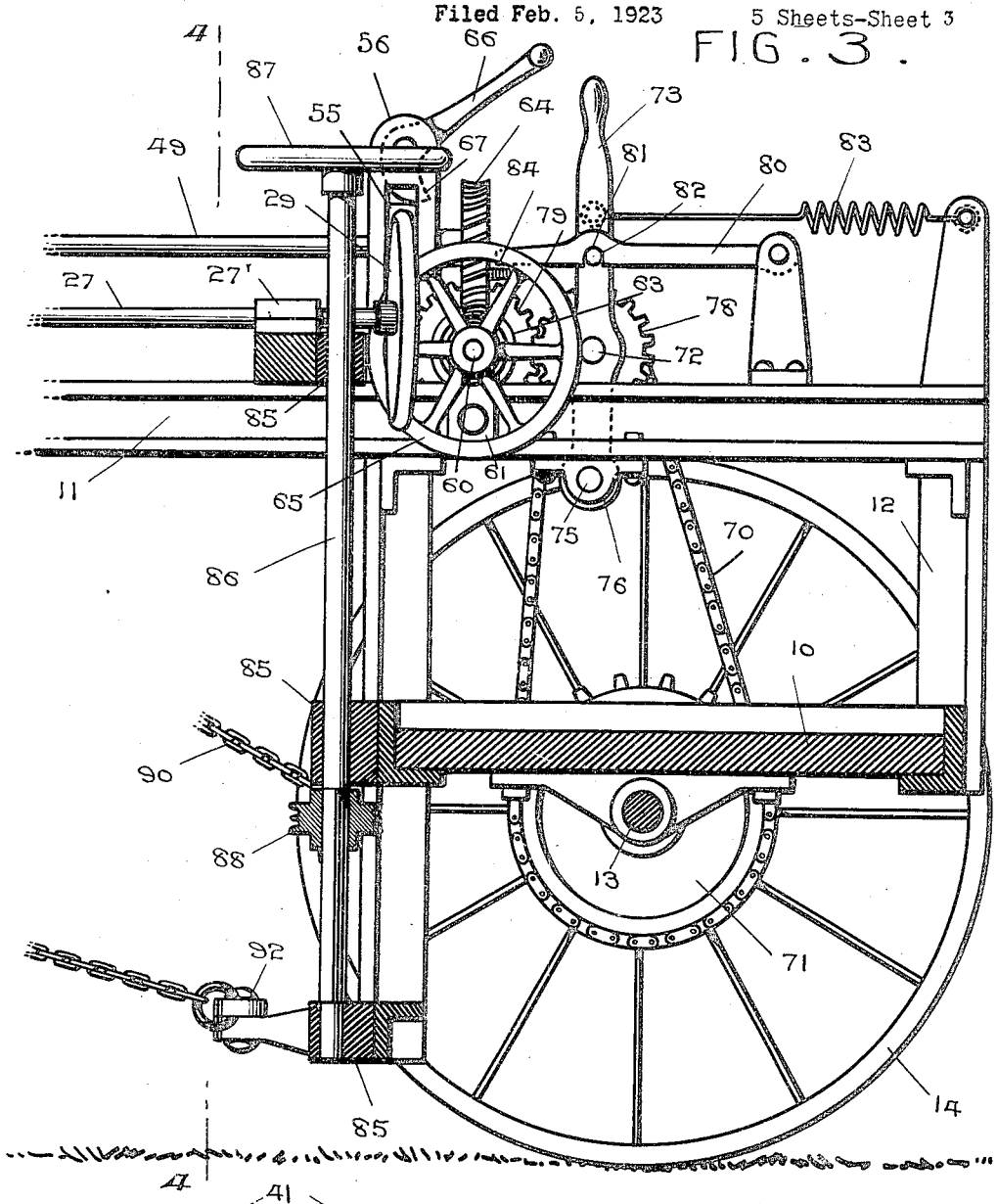
Fig. 3 is an enlarged longitudinal vertical section on the line 3—3 of Fig. 1.
Figure 4:
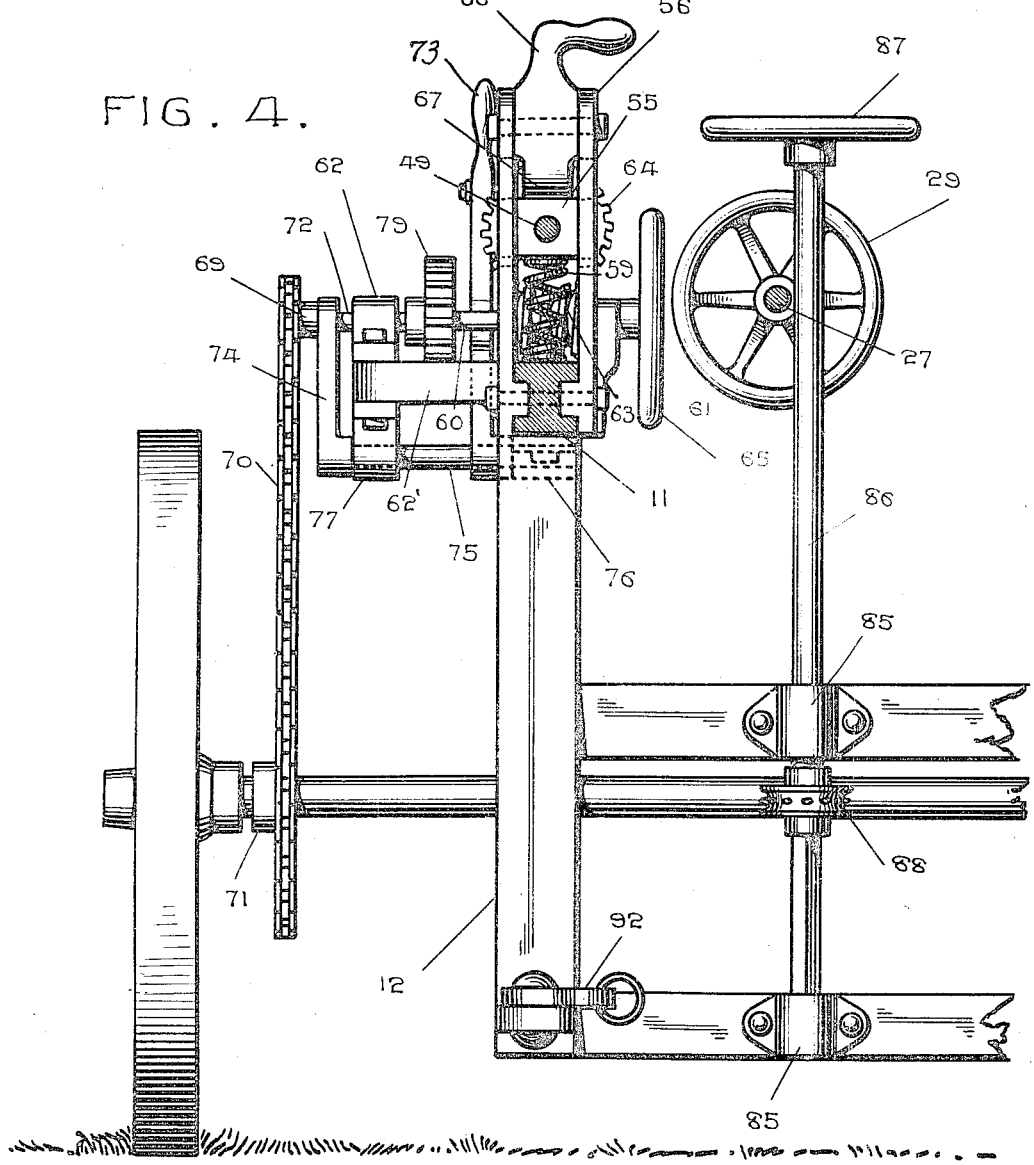
Fig. 4 is a transverse vertical section on the line 4—4 of Fig. 3.

The machine comprises a suitable main frame 11 having the platform 10 at its rear end, on which the operator can stand, and having a dropped portion 12 at its rear end mounted on the rear axle 13. Said axle is journaled to the frame, and the ground wheels 14 are suitably secured on the ends of said rear axle 13.

A combination steering gear is provided, as disclosed in detail in said application supra, which need not be considered in detail herein, but which will be described briefly. Such steering gear includes the front axle 16 pivoted between its ends to turn about the axle of a vertical shaft 17 journaled in the forward end portion of the frame 11, and the front wheels 19 are fitted for rotation on the knuckles 18 which are hingedly connected to the ends of the axle 16, thereby permitting the axle 16 to be turned to different angles, and to also permit the knuckles 18 to be turned to different angles relatively to the axle, for keeping the wheels 19 substantially parallel with the frame 11 when desired or necessary. A tongue 20 is connected to the axle 12 for pulling the machine from a tractor, or by means of draft animals, and enabling the axle 16 to be turned by the transverse movement of the tongue. The shaft 17 is operatively connected to the knuckles 18, as disclosed in said application, for turning the knuckles relatively to the axle 16, and a longitudinal shaft 27 is journaled in bearings 27' on the frame 11 and has its forward end geared to the shaft 17. The shaft 27 has a hand wheel 29 at its rear end under the control of the operator.

The scraper blade 30 is disposed underneath the frame 11 between the front and rear wheels, and is supported from a trailing floating frame 31 comprising a pair of rearwardly diverging beams 32 and a cross bar 37 secured to the rear ends of said beams. The forward ends of the beams are secured to a draw bar 33 loosely engaging a member 34 engaging around the shaft 17 between the axle 16 and frame 11, thus providing a flexible or loose joint connection between the frames 31 and 11, permitting the frame 31 to swing upwardly, downwardly and sidewise.

The frame 31 trails in rear of the front axle to have a floating action with the scraper blade resting on the ground or road bed. The frame 31 has a cross piece 38 between the bars or beams 32 forwardly of the cross bar 37, and a pivot plate 39 is secured to the cross piece 38 and bar 37. A carrier 40 for the blade 30 is pivotally connected with the rear end portion of the frame 31 to support said blade for turning movement about a substantially vertical axis. The carrier 40 is of arcuate form, with its terminals extending rearwardly and downwardly, and a cross piece 41 is secured to the carrier 40 and is pivoted between its ends to the plate 39 of the frame 31, as at 42, whereby said carrier can turn about a substantially vertical axis underneath the frame 31. The terminals of the carrier 40 are bent or extended downwardly, as at 43, in rear of the blade 30 and said blade is supported from said terminals 43 by means of rivets or bolts 44. Said blade has longitudinal slots 45 receiving said rivets or members 44 to permit the blade to shift or slide longitudinally of itself with respect to the carrier 40 and frame 31, whereby the ends of the blade can be projected beyond and from the sides of the machine. In order to connect the carrier 40 and frame 31 to better transmit the strains between said frame and carrier, depending guide members or stirrups 46 are secured to the beams 32 of the frame and the carrier 40 extends through said guide members for sliding movement, thereby relieving the pivot 42 of considerable strain and also maintaining the frame and carrier in proper correlated position. The swinging or turning movement of the carrier 40 with respect to the frame 31 about the pivot 42 is limited, and, for this purpose, the carrier has a series of apertures 47 to receive adjustable stops 48, which may be pins, bolts or the like. These stops 48 are set in the desired position at the opposite sides of the frame 31, to contact with the guide members 46 or beams 32 at the limits of turning movement of the carrier 40 and blade 30.

A mechanism is provided for raising and lowering the blade 30, such mechanism embodying right and left hand devices for the upward and downward movement of the opposite sides of the frame 31 and opposite ends of the blade 30. Each of said devices includes a longitudinal shaft 49 above the corresponding side member or beam of the frame 11, and journaled near its forward end within a bearing 50 trunnioned within a post or pedestal 51 rising from the frame 11 at the corresponding side. The shaft 49 has a crank 52 at its forward end to which the upper end of a lift rod 53 is engaged. The lower terminal of said rod 53 extends slidably through the corresponding end portion of the cross bar 37 of the frame 31 and has a nut 54 or other seat member thereon on which the cross bar 37 is seated; thereby compelling the frame 31 to be lifted at the corresponding side with the rod 53, but permitting said frame to move upwardly on the rod for floating movement, when necessary to permit the blade 30 to pass over an unyielding obstruction. The shaft 49 is journaled near its rear end in a bearing 55 movable upwardly and downwardly within a slotted post 56 secured to and rising from the corresponding side member of the frame 11, said bearing being slidable upwardly and downwardly in the post 56, whereby the rear end of the shaft 49 can be raised and lowered, the bearings 50 and 55 adjusting themselves with the shaft. A coiled expansion spring 59 is disposed between the bearing 55 and frame 11, whereby to yieldingly raise the bearing 55 and shaft 49.

Means is provided for turning the shaft 49, and includes a transverse shaft 60 journaled in a bearing 61 carried by the frame 11 and a bearing 62 of an outstanding bracket 62' and having a worm 63 thereon for the engagement of a worm wheel 64 secured on the rear terminal of the shaft 49, when said shaft 49 is depressed, said wheel 64 being normally raised with the shaft 49 by the spring 59 away from the worm when the shaft is released for upward movement, thereby also releasing the shaft 49 for turning movement. A hand wheel 65 is secured on the inner end of the shaft 60 to be conveniently operated by the operator, for the manual operation of the shafts 49 when desired.

In order to depress the shaft 49 of each lifting device, a hand lever 66 is fulcrumed within the upper portion of the corresponding post 56, and has a cam 67 to bear down on the bearing 55, when said hand lever is swung rearwardly and downwardly, so that the cam will depress the bearing 55 and shaft 49 to bring the worm wheel 64 into mesh with the worm 63 underneath. The operator, by swinging the levers 66, can therefore bring either or both of the shafts 49 into operative connection, through the worm wheels and worms, with the shafts 60, and when the levers 66 are swung upwardly and forwardly, the springs 59 will raise the bearings 55 to disconnect the worm wheels 64 from the worms 63.

Each lifting device also includes means whereby the shaft 60 can be turned by power, for lifting the scraper blade without manual effort on the part of the operator, excepting to operate a control member, and, as shown, the power is derived from the rear wheels 14 and axle 13. Thus, sprocket wheels 69 are secured on shafts 72 mounted in rear of the respective shafts 60, and sprocket chains 70 connect the sprocket wheels 69 with sprocket wheels 71 secured on the axle 13 at the opposite sides, whereby each shaft 72 is independently driven from the rear axle. A clutch or make and break connection is provided between each pair of shafts 60 and 72. As shown, a disengageable gear connection between said shafts is provided. Thus, the shaft 72 of each device is journaled in an upwardly extending hand lever 73 and an upwardly extending arm 74, said lever and arm being secured at their lower ends to a short transverse rock shaft 75 located below the shaft 72 and journaled in a bearing 76 secured to the under side of the side beam of the frame and also journaled in a bearing 77 secured to the under side of the outstanding bracket 62'. The arm 74 and chain 70 are located at the outer side of the bracket 62', while the hand lever 73 is located adjacent to the side beam of the frame 11. The shaft 72 can thus be shifted forwardly and rearwardly parallel with respect to its axis, and a gear wheel 78 secured on the shaft 72 is adapted to mesh with a gear wheel 79 secured on the corresponding shaft 60, when the lever 73 is swung forwardly, thereby connecting the shaft 60 to the axle 13, for driving said shaft 60. When the hand lever 73 is swung rearwardly, the gear wheel 78 being disengaged from the gear wheel 79 will open or break the operative connection to stop the shaft 60.

A catch 80 is pivoted on the frame 11 in rear of each lever 73, and extends forwardly, said catch having a notch 81 engageable over a lug or pin 82 carried by the lever 73, whereby to hold the lever in its forward position with the gear wheels 78 and 79 in mesh. A spring 83 is connected to the lever 73 and frame 11 for swinging the lever 73 rearwardly and separating the gear wheels 78 and 79 when the shaft 80 is raised or disengaged from the lug 82. The catch 80 is automatically disengaged from the lever 73, for automatically opening or breaking the connection between the shaft 60 and the source of power, when the crank 52 is completely raised, and to accomplish this in a simple manner, the forward end of the catch 80 extends close to the rear face of the corresponding worm wheel 64, and said worm wheel has a rearwardly extending lifting lug 84 which contacts with and raises the catch 80 when said worm wheel is turned to bring the crank 52 to its uppermost position. In this way, when the crank 52 is raised, the lug 84 raising the catch 80, will release the lever 73, so that the spring 83 will swing said lever rearwardly to remove the gear wheel 78 from the gear wheel 79, thereby stopping the rotation of the shaft 60 and preventing the crank 52 from moving on further and downward.

In raising the scraper blade 30, instead of using manual power by turning the hand wheels 65, the blade can be lifted by power from the wheels 14. Thus, when the levers 66 are swung rearwardly so that the cams 67 depress the bearings 55 and shafts 49, the worm wheels 64 are depressed into mesh with the worms 63, and by swinging the levers 73 forwardly, the gear wheels 78 are brought into mesh with the gear wheels 79, thereby closing the operative connections between the shafts 49 and the rear axle 13. The catches 80 drop into engagement with the lugs 82, to hold the levers 73 in forward position with the gear wheels 78 and 79 in mesh. The turning movement of the axle 13 will transmit motion by way of the chains 70 to the shafts 72, from which the power is transmitted by the gear wheels 78 and 79 to the shafts 60, and by way of the worms and worm wheels power is delivered to the shafts 49, so as to turn the cranks 52 upwardly, thereby lifting the frame 31 and blade 30. Either or both ends of the blade 30 can thus be lifted by mechanical power derived from the rotation of the wheels 14, as the machine is moved forwardly, and when either crank 52 is completely raised, the lug 84 of the corresponding worm wheel 64 will contact with and raise the corresponding catch 80, thereby releasing the lever 73 which will be swung rearwardly by its spring 83, to remove the gear wheel 78 from the gear wheel 79. This will open or break the connection between the shaft 60 and axle 13, so as to stop the movement of the crank 52. The worm wheel 64 of each shaft 49 in engaging the worm 63 will prevent the shaft 49 from turning, when the gear wheel 78 is disengaged by the gear wheel 79, thereby supporting the blade in raised position at the corresponding side. To lower the blade, at either end, it is only necessary to swing the corresponding lever 66 forwardly, so as to permit the bearing 55 of the corresponding shaft 49 to be raised by the frame 59, thereby removing the worm wheel 64 from the worm 63. This will free the worm wheel 64 and shaft 49 from the worm 63 and shaft 60, whereby the shaft 49 can turn under the weight of the frame 31 and blade 30 imposed on the lift rod 53 and crank 52.

In this way, when the shafts 49 are raised to release the worm wheels 64, the blade will gravitate to the ground, but the downward movement of the blade can be limited by again engaging the worm wheels 64 with the worms 63 by swinging the levers 66 rearwardly. The blade is thus readily controlled to move upwardly and downwardly and the arrangement enables the blade to be raised by mechanical power to eliminate manual effort on the part of the operator, excepting to swing the controlling levers.

Means is also provided for turning the blade 30 about the pivot 42 and shifting said blade longitudinally of itself. This device includes a vertical shaft 86 journaled in bearings 85 carried by the frame 11 and portion 12 thereof, and said shaft 86 has a hand wheel 87 at its upper end to be conveniently rotated by the operator. A sheave 88 is mounted on the shaft 86 to turn with said shaft and to slide upwardly and downwardly a limited amount between the two lower bearings 85, and a chain 90 passes around said sheave and through pulley blocks 91 loosely connected to the blade 30 near its opposite ends thereof. The terminals of the chain 90 are anchored, as at 92, to the portion 12 of the frame 11 at opposite sides. Thus, the chain 90 has forwardly diverging loops engaging the pulley blocks 91, as seen in Fig. 5, and from said pulley blocks the terminal portions of the chain extend to the opposite sides of the frame 11 to the anchors 92. By turning the shaft 86, so as to rotate the sheave 78, the intermediate portion of the chain is moved, whereby the pull on the chain loop at one side will swing the blade 30 with the carrier 40 about the substantially vertical pivot 42. Should the forward end of the blade 30 strike an unyielding object, thereby swinging said end of the blade rearwardly relatively to the frame 11, the terminal of the chain which receives the strain can tear loose from the frame 11, inasmuch as the anchors 92 are preferable frangible for that purpose, to avoid the breaking of the machine should a large stone or other unyielding obstruction be encountered by the blade. The blade is readily turned to change the angular position thereof with respect to the frame 11 and line of travel, by the rotation of the hand wheel 87, and, furthermore, the blade turning device is also operable for sliding the blade longitudinally of itself to project one end or the other thereof farther beyond the side of the machine. Thus, when the carrier 40 and blade 30 are swung the limit in one direction so that the corresponding stop 48 strikes the guide member 46 or frame 31, the turning movement of said carrier and blade is arrested, and the pull exerted on the rear end of the blade by the chain 90 will result in the blade being slid longitudinally to project the forward end thereof, as illustrated in Figs. 1 and 5. In this manner, when the blade 30 is swung to move one end forwardly to the limit permitted, then said forward end of the blade can be projected farther from the machine, by the continued rotation of the shaft 86 after the stop 48 strikes the frame 41. Then, when the blade is turned in the opposite direction, and the other stop 48 strikes the frame 31, the blade can be slid longitudinally toward the opposite side. The friction between the blade 30 and carrier 41 is greater than the friction of the pivotal connection 42 between the carrier 40 and frame 31, so that the blade 30 and carrier 40 will swing about the pivot 42 rather than sliding or shifting relatively to said carrier, when the chain 90 is moved by the sheave 86. The blade will thus turn when free to do so, and is only shifted longitudinally when one of the stops 48 strikes the frame 31, or when the blade is shifted manually in any desired angular position. The sheave 88 can slide vertically with the chain 90 when the blade 30 is raised and lowered.

The machine is used for grading roads, and its operation is generally the same as such machines already in use, excepting in the devices for controlling the blade, and the operation will no doubt be readily understood from the foregoing, in which the improved features have been described, both as to construction and operation.

Figs. 7, 8 and 9 illustrate a modified driving connection between one of the ground wheels and the devices operated therefrom. The rear wheels 14 are rotatable on separate axle sections 13' which may be clamped or secured to the portion 12' of the frame in any suitable manner, and the socket wheel 71' is secured to one of the ground wheels 14, permitting the axle section 13' of the other ground wheel to be adjusted transversely of the machine for spacing the wheels 14 different distances apart. An endless chain 70' passes around the sprocket wheel 71' and the sprocket wheel 69 of the shaft 72 at the corresponding side. Said chain 70' also passes around a sprocket wheel 101 on one end of a counter shaft 100 journaled to the portion 12' of the main frame in rear of the axle sections 13'. The shaft 100 transmits the power to the opposite side, and an endless sprocket chain 70'' extends around a sprocket wheel 101 on the other end of the shaft 100 and around the sprocket wheel 69 of the shaft 72 opposite to the chain 70'. Thus, the chain 70' is driven from the sprocket wheel 71' secured to the ground wheel at one side of the machine, and drives the shaft 72 at such side of the machine, said chain 70' also driving the shaft 100 to transmit the power to the opposite side and through the chain 70'' to the other shaft 72.

The power is thus derived from one rear wheel only, permitting the other rear wheel to be adjusted transversely.

Having thus described the invention, what is claimed as new is:—

1. A grading machine comprising a main frame, a floating frame connected thereto, means on the main frame for raising and lowering the floating frame, a carrier pivotally connected with the floating frame for turning movement about a substantially vertical axis, and a scraper blade carried by said carrier and slidable longitudinally of itself with respect to the carrier.

2. A grading machine comprising a frame, a carrier pivotally connected with the frame for turning movement about a substantially vertical axis, a blade slidably carried by the carrier for longitudinal movement of itself, and operating means connected to the blade for turning same with the carrier and for sliding the blade relatively to the carrier.

3. A grading machine comprising a main frame, a floating frame connected thereto, means upon the main frame for raising and lowering the floating frame, a carrier pivotally connected with the floating frame to turn about a substantially vertical axis, a scraper blade slidably carried by the carrier for movement longitudinally of itself, and operating means connected to the blade for turning same with the carrier and for sliding the blade longitudinally relatively to the carrier.

4. A grading machine comprising a main frame, a floating frame connected thereto, means upon the main frame for raising and lowering the floating frame, a carrier pivotally connected to the floating frame for turning movement about a substantially vertical axis, a scraper blade carried for sliding movement by the carrier to slide longitudinally of itself, an operating shaft carried by the main frame, a sheave on said shaft, a chain having its ends anchored to the main frame and its intermediate portion engaging said sheave, said chain having diverging looped portions, and means carried by the blade near the ends thereof engaging said looped portions of the chain for turning said blade with the carrier and sliding the blade relatively to the carrier when said sheave is rotated.

5. A grading machine according to claim 4, and also including means between said carrier and floating frame for limiting the turning movement of said carrier and blade and to compel the blade to slide.

6. A grading machine comprising a frame, a carrier pivotally connected to said frame to turn about a substantially vertical axis, a blade carried by the carrier for sliding movement longitudinally of itself, means between said carrier and frame for limiting the turning movement of the carrier and blade, and operating means connected with the blade for turning it with the carrier and for sliding it longitudinally at the limits of swinging movement of the carrier and blade.

7. A grading machine comprising a frame, a scraper blade connected to the frame for upward and downward movement, a shaft mounted on the frame and operatively connected with the blade for raising the blade, a second shaft mounted on the frame, means for rotating the second shaft, a worm on the second shaft, a worm wheel on the first named shaft, and means for moving one of said shafts to bring said worm and worm wheel into and out of engagement.

8. A grading machine comprising a frame, a scraper blade connected to the frame for upward and downward movement, a shaft operatively connected with the blade for raising it, a second shaft, a worm on the second shaft, a worm wheel on the first-named shaft to mesh with the worm, means for moving one of said shafts to bring the worm and worm wheel into and out of engagement, power-driven means on the frame, and controllable means for making and breaking the connection between said power driven means and second shaft.

9. A grading machine comprising a frame, a scraper blade connected to the frame for upward and downward movement, power driven means, and a pair of devices for raising the opposite ends of the blade, each of said devices including a shaft operatively connected with one end of the blade and shiftably mounted on the frame, a second shaft, a worm on the second shaft, a worm wheel on the first named shaft to move into and out of engagement with said worm, means for shifting the first named shaft, and means for operatively connecting the second shaft and said power-driven means.

10. A grading machine comprising a scraper blade mounted for upward and downward movement, a shaft having a crank connected with the blade for raising the blade, power driven means, an operative connection between said shaft and means and including members adapted to be separated for breaking the connection, means tending to separate said members, a catch for holding the members in engagement, and a member rotatable with said shaft to disengage the catch when the crank is raised to permit said members to be separated.

In testimony whereof I have signed my name to this specification in the presence of two subscribing witnesses.

CHARLES H. JONES.

Witnesses:
LLOYD H. LINDQUIST,
F. C. PETERSON.